US010393990B2

(12) United States Patent
Huang

(10) Patent No.: US 10,393,990 B2
(45) Date of Patent: Aug. 27, 2019

(54) IMAGING APPARATUS AND IMAGING METHOD

(71) Applicant: Huawei Technologies Co., Ltd., Shenzhen (CN)

(72) Inventor: Zhi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 15/902,797

(22) Filed: Feb. 22, 2018

(65) Prior Publication Data

US 2018/0180836 A1 Jun. 28, 2018

Related U.S. Application Data

(63) Continuation of application No. PCT/CN2016/072302, filed on Jan. 27, 2016.

(30) Foreign Application Priority Data

Aug. 25, 2015 (CN) .......................... 2015 1 0525929

(51) Int. Cl.
*G02B 7/02* (2006.01)
*G02B 7/04* (2006.01)
(Continued)

(52) U.S. Cl.
CPC ........... *G02B 7/04* (2013.01); *G02B 27/0075* (2013.01); *G03B 5/00* (2013.01); *G03B 13/32* (2013.01);
(Continued)

(58) Field of Classification Search
CPC ........................................................ G02B 7/04
(Continued)

(56) References Cited

U.S. PATENT DOCUMENTS 7,956,924 B2 6/2011 Georgiev
8,593,564 B2 11/2013 Border et al.
(Continued)

FOREIGN PATENT DOCUMENTS

CN 101500085 A 8/2009
CN 101656835 A 2/2010
(Continued)

OTHER PUBLICATIONS

Machine Translation and Abstract of Chinese Publication No. CN105093472, Nov. 25, 2015, 39 pages.
(Continued)

*Primary Examiner* — James C. Jones
(74) *Attorney, Agent, or Firm* — Conley Rose, P.C.

(57) ABSTRACT

An imaging apparatus includes a main lens, an image sensor, a first microlens array and a second microlens array, where the first and the second microlens arrays are disposed between the main lens and the image sensor. The first microlens array is disposed between the second microlens array and the main lens. The first microlens array is arranged in parallel with the second microlens array. The first microlens array includes M*N first microlenses. The second microlens array includes M*N second microlenses. The M*N first microlenses are in a one-to-one correspondence to the M*N second microlenses in a concave-convex manner. When a first microlens is a planoconcave lens, a second microlens is a planoconvex lens, and when the first microlens is the planoconvex lens, the second microlens is the planoconcave lens. A driving apparatus is configured to adjust a distance between the first microlens array and the second microlens array.

16 Claims, 10 Drawing Sheets

(51) Int. Cl.

| | |
|---|---|
| ***G03B 13/32*** | (2006.01) |
| ***H04N 5/232*** | (2006.01) |
| ***G02B 27/00*** | (2006.01) |
| ***G03B 5/00*** | (2006.01) |
| ***H04N 5/235*** | (2006.01) |
| ***H04N 5/225*** | (2006.01) |

(52) U.S. Cl.
CPC ......... *H04N 5/22541* (2018.08); *H04N 5/232* (2013.01); *H04N 5/2352* (2013.01); *H04N 5/23212* (2013.01); *H04N 5/23245* (2013.01)

(58) Field of Classification Search
USPC .......................................................... 359/822
See application file for complete search history.

(56) References Cited

U.S. PATENT DOCUMENTS

| | | | |
|---|---|---|---|
| 8,724,000 B2 | 5/2014 | Georgiev et al. | |
| 2005/0128308 A1 | 6/2005 | Tholl et al. | |
| 2009/0190022 A1* | 7/2009 | Ichimura | G02B 3/0056 348/340 |
| 2010/0045844 A1 | 2/2010 | Yamamoto et al. | |
| 2010/0066812 A1 | 3/2010 | Kajihara et al. | |
| 2014/0204184 A1 | 7/2014 | Ng et al. | |
| 2016/0227085 A1 | 8/2016 | Xu et al. | |

FOREIGN PATENT DOCUMENTS

| | | |
|---|---|---|
| CN | 104580869 A | 4/2015 |
| CN | 105093472 A | 11/2015 |
| JP | 2013145980 A | 7/2013 |

OTHER PUBLICATIONS

Machine Translation and Abstract of Japanese Publication No. JP2013145980, Jul. 25, 2013, 13 pages.

Foreign Communication From a Counterpart Application, PCT Application No. PCT/CN2016/072302, English Translation of International Search Report dated May 26, 2016, 2 pages.

* cited by examiner

IMAGING APPARATUS AND IMAGING METHOD

CROSS-REFERENCE TO RELATED APPLICATIONS

This application is a continuation of International Patent Application No. PCT/CN2016/072302 filed on Jan. 27, 2016, which claims priority to Chinese Patent Application No. 201510525929.0 filed on Aug. 25, 2015. The disclosures of the aforementioned applications are hereby incorporated by reference in their entireties.

TECHNICAL FIELD

The present disclosure relates to the field of image processing technologies, and in particular, to an imaging apparatus and an imaging method.

BACKGROUND

In conventional photography, to highlight a theme scene, a camera often focuses on a depth of the theme scene such that the theme scene is clearly imaged on an image sensor of the camera, and scenes in other depths are blurrily imaged on the image sensor.

With development of a digital imaging technology, an image processing technology, and a machine vision technology, a refocusing technology emerges. According to the refocusing technology, after an image is formed, a new focusing depth can be selected according to a user need to obtain a clear image of objects in different depths. A light field camera uses the refocusing technology. The light field camera not only can obtain intensity of each incident ray, but also can record a direction that the ray enters a lens. Therefore, when shooting an image, the light field camera not only can obtain a two-dimensional image by means of shooting, but also can calculate a depth of a scene.

The light field camera differs from an ordinary camera in that, in the light field camera, a two-dimensional microlens array is provided between the image sensor and a camera lens (a main lens), and the image sensor is located on an imaging plane of the microlens array.

According to an optical principle of the light field camera, if a higher spatial resolution (i.e., higher light ray direction precision) is obtained, an image resolution is reduced. Under a given quantity of pixels of the image sensor, the spatial resolution and the image resolution cannot be increased simultaneously. Therefore, an image resolution of a current light field camera is lower than a resolution of an ordinary camera.

An existing technical solution has proposed that a low-resolution light field mode and a high-resolution normal mode should be implemented in one camera such that a user can switch between the two modes according to a requirement. To implement switch between the two modes in the camera, a microlens array and a piece of flat glass may be disposed between a main lens and an image sensor of the camera, and switch is implemented by moving the microlens array and the flat glass into or out of an optical path. For example, when a light field camera function is used, the flat glass may be moved out of the optical path, and the microlens array may be moved into the optical path, when an ordinary camera function is used, the flat glass may be moved into the optical path, and the microlens array may be moved out of the optical path. However, it takes a relatively long time to move the microlens array into or out of the optical path, resulting in a relatively long switch time.

Therefore, how fast switch is implemented between different imaging modes of a camera is an urgent problem to be resolved.

SUMMARY

The present disclosure provides an imaging apparatus and an imaging method, to implement fast switch between different imaging modes of a camera.

According to a first aspect, the present disclosure provides an imaging apparatus, including a main lens, an image sensor, a first microlens array, a second microlens array, and a driving apparatus, where the first microlens array and the second microlens array are disposed between the main lens and the image sensor, the first microlens array is disposed between the second microlens array and the main lens, the first microlens array is arranged parallel with the second microlens array, the first microlens array includes M*N first microlenses, and the second microlens array includes M*N second microlenses, the second microlens is a planoconvex lens if the first microlens is a planoconcave lens, the second microlens is a planoconcave lens if the first microlens is a planoconvex lens, the M*N first microlenses are in a one-to-one correspondence to the M*N second microlenses in a concave-convex manner, M and N are positive integers, and at least one of M or N is greater than 1, and the driving apparatus is connected to the main lens, the image sensor, the first microlens array, and the second microlens array, and is configured to adjust a distance between the first microlens array and the second microlens array.

In a first possible implementation, the driving apparatus is configured to adjust the distance between the first microlens array and the second microlens array to a first distance to provide a light field mode, where the first distance is greater than 0, and in the light field mode, an incident ray is refracted by the main lens, refracted by the first microlens array and the second microlens array, and then projected onto the image sensor.

With reference to the first possible implementation, in a second possible implementation, a combination of the first microlens array and the second microlens array is equivalent to a third microlens array, and the driving apparatus is further configured to adjust a relative location among the main lens, the image sensor, the first microlens array, and the second microlens array to a first relative location such that an imaging plane of the third microlens array is located on a plane on which the image sensor is located, and a main plane of the third microlens array is located on an imaging plane of the main lens.

With reference to the first possible implementation, in a third possible implementation, a combination of the first microlens array and the second microlens array is equivalent to a third microlens array, and the driving apparatus is further configured to adjust a relative location among the main lens, the image sensor, the first microlens array, and the second microlens array to a second relative location such that an imaging plane of the third microlens array is located on a plane on which the image sensor is located, and an imaging plane of the main lens is located between the main lens and a main plane of the third microlens array.

With reference to the first possible implementation, in a fourth possible implementation, a combination of the first microlens array and the second microlens array is equivalent to a third microlens array, and the driving apparatus is further configured to adjust a relative location among the main lens, the image sensor, the first microlens array, and the second microlens array to a third relative location such that an imaging plane of the third microlens array is located on a plane on which the image sensor is located, and the image sensor is located between a main plane of the third microlens array and an imaging plane of the main lens.

With reference to the first aspect, in a fifth possible implementation, the driving apparatus is configured to adjust the first microlens array and the second microlens array such that the M*N first microlenses are attached to the M*N second microlenses to provide a non-light-field mode, where in the non-light-field mode, an incident ray is refracted by the main lens, and directly projected onto the image sensor through the first microlens array and the second microlens array.

With reference to the fifth possible implementation, in a sixth possible implementation, the driving apparatus is further configured to adjust a relative location among the main lens, the image sensor, the first microlens array, and the second microlens array to a fourth relative location such that an imaging plane of the main lens is located on a plane on which the image sensor is located.

With reference to any one of the first aspect or the first to the sixth possible implementations, in a seventh possible implementation, the first microlens and the second microlens are made of a same optical material.

With reference to any one of the first aspect or the first to the sixth possible implementations, in an eighth possible implementation, the first microlens and the second microlens are made of different optical materials, and a difference between refractive indexes of the optical materials used by the first microlens and the second microlens falls within a range of [−0.01, 0.01]

According to a second aspect, an imaging method is provided, where the imaging method is applied to an imaging apparatus, and the imaging apparatus includes a main lens, an image sensor, a first microlens array, a second microlens array, and a driving apparatus, where the first microlens array and the second microlens array are arranged between the main lens and the image sensor, the first microlens array is disposed between the second microlens array and the main lens, the first microlens array is arranged parallel with the second microlens array, the first microlens array includes M*N first microlenses, and the second microlens array includes M*N second microlenses, the second microlens is a planoconvex lens if the first microlens is a planoconcave lens, the second microlens is a planoconcave lens if the first microlens is a planoconvex lens, the M*N first microlenses are in a one-to-one correspondence to the M*N second microlenses in a concave-convex manner, M and N are positive integers, and at least one of M or N is greater than 1, the driving apparatus is connected to the main lens, the image sensor, the first microlens array, and the second microlens array, and is configured to adjust a distance between the first microlens array and the second microlens array, and the imaging method includes adjusting the distance between the first microlens array and the second microlens array to a first distance such that the imaging apparatus provides a light field mode, where the first distance is greater than 0, and in the light field mode, an incident ray is refracted by the main lens, refracted by the first microlens array and the second microlens array, and then projected onto the image sensor, or adjusting the first microlens array and the second microlens array such that the M*N first microlenses are attached to the M*N second microlenses, and the imaging apparatus provides a non-light-field mode, where in the non-light-field mode, an incident ray is refracted by the main lens, and directly projected onto the image sensor through the first microlens array and the second microlens array.

In a first possible implementation, a combination of the first microlens array and the second microlens array is equivalent to a third microlens array, and the method further includes adjusting a relative location among the main lens, the image sensor, the first microlens array, and the second microlens array to a first relative location in the light field mode such that an imaging plane of the third microlens array is located on a plane on which the image sensor is located, and a main plane of the third microlens array is located on an imaging plane of the main lens.

With reference to the second aspect, in a second possible implementation, a combination of the first microlens array and the second microlens array is equivalent to a third microlens array, and the method further includes adjusting a relative location among the main lens, the image sensor, the first microlens array, and the second microlens array to a second relative location in the light field mode such that an imaging plane of the third microlens array is located on a plane on which the image sensor is located, and an imaging plane of the main lens is located between the main lens and a main plane of the third microlens array.

With reference to the second aspect, in a third possible implementation, a combination of the first microlens array and the second microlens array is equivalent to a third microlens array, and the method further includes adjusting a relative location among the main lens, the image sensor, the first microlens array, and the second microlens array to a third relative location in the light field mode such that an imaging plane of the third microlens array is located on a plane on which the image sensor is located, and the image sensor is located between a main plane of the third microlens array and an imaging plane of the main lens.

With reference to the second aspect, in a fourth possible implementation, the method further includes adjusting a relative location among the main lens, the image sensor, the first microlens array, and the second microlens array to a fourth relative location in the non-light-field mode such that an imaging plane of the main lens is located on a plane on which the image sensor is located.

With reference to any one of the second aspect or the first to the fourth possible implementations of the second aspect, in a fifth possible implementation, the first microlens and the second microlens are made of a same optical material.

With reference to any one of the second aspect or the first to the fourth possible implementations of the second aspect, in a sixth possible implementation, the first microlens and the second microlens are made of different optical materials, and a difference between refractive indexes of the optical materials used by the first microlens and the second microlens falls within a range of [−0.01, 0.01]

Based on the foregoing technical solutions, two distance-adjustable microlens arrays that are opposite to each other in a concave-convex manner are disposed between the main lens and the image sensor of the imaging apparatus such that the imaging apparatus can be in different shooting modes when the two microlens arrays are in different distances. Because the distance between the two microlens arrays can be adjusted in a relatively short time, the imaging apparatus can implement fast switch between different imaging modes.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applied to cameras of different structures to implement fast switch between a light field mode and a non-light-field mode.

Figure 1:
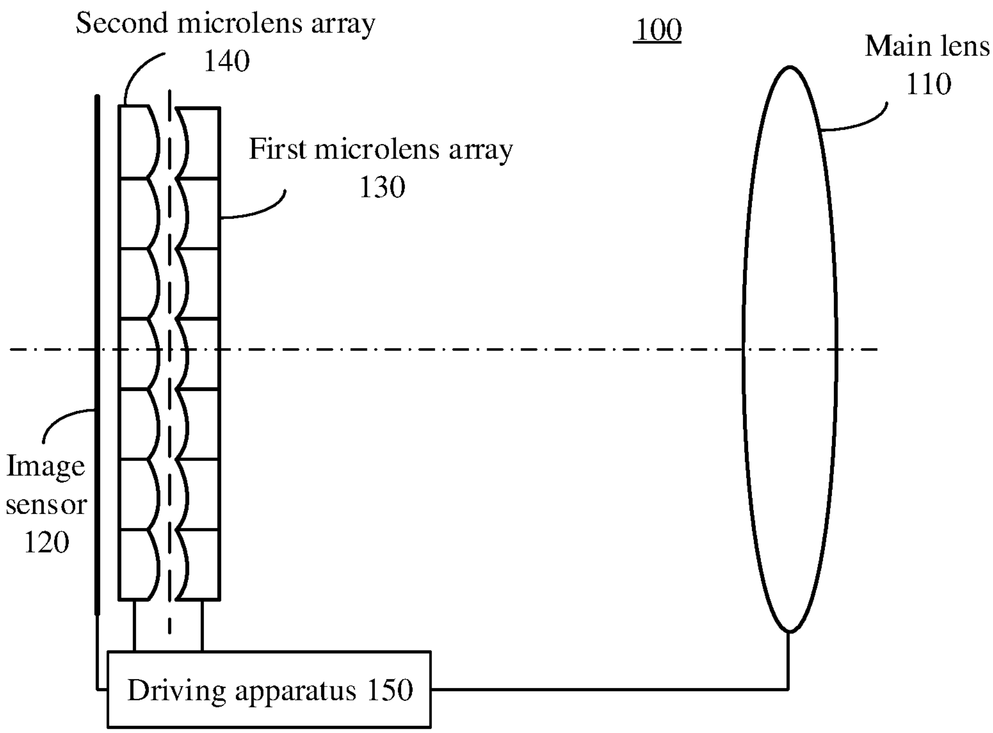
FIG. 1 is a schematic structural diagram of an imaging apparatus according to an embodiment of the present disclosure.

FIG. 1 is a schematic structural diagram of an imaging apparatus 100 according to an embodiment of the present disclosure. The imaging apparatus 100 includes a main lens 110, an image sensor 120, a first microlens array 130, a second microlens array 140, and a driving apparatus 150.

The first microlens array 130 and the second microlens array 140 are disposed between the main lens 110 and the image sensor 120. The first microlens array 130 is disposed between the second microlens array 140 and the main lens 110. The first microlens array 130 is arranged in parallel with the second microlens array 140. The first microlens array 130 includes M*N first microlenses, and the second microlens array 140 includes M*N second microlenses. If the first microlens is a planoconcave lens, the second microlens is a planoconvex lens, and if the first microlens is a planoconvex lens, the second microlens is a planoconcave lens. The M*N first microlenses are in a one-to-one correspondence to the M*N second microlenses in a concave-convex manner. M and N are positive integers, and at least one of M or N is greater than 1. The driving apparatus 150 is connected to the main lens 110, the image sensor 120, the first microlens array 130, and the second microlens array 140, and is configured to adjust a distance between the first microlens array 130 and the second microlens array 140.

Further, in the imaging apparatus 100, the main lens 110, the first microlens array 130, the second microlens array 140, and the image sensor 120 are sequentially arranged in parallel to each other to form an optical path. The imaging apparatus 100 may move, using the driving apparatus 150, at least one of the two microlens arrays 130 and 140 along an optical axis direction to adjust the distance between the two microlens arrays 130 and 140. For example, the two microlens arrays 130 and 140 may be close to or away from each other, or attached together. When a preset distance is kept between the two microlens arrays 130 and 140, optical performance of each first microlens and a corresponding second microlens is equivalent to optical performance of a single microlens such that the imaging apparatus 100 is in a light field mode to implement a function of an optical camera. For another example, when the two microlens arrays 130 and 140 are attached together, that is, the distance between the two microlens arrays is zero, the optical performance of each first microlens and the corresponding second microlens is equivalent to optical performance of flat glass, and the imaging apparatus is in a non-light-field mode or a normal mode to implement a function of a common high-resolution camera.

According to this embodiment of the present disclosure, two distance-adjustable microlens arrays 130 and 140 that are opposite to each other in a concave-convex manner are disposed between the main lens 110 and the image sensor 120 of the imaging apparatus 100 such that the imaging apparatus 100 can be in different shooting modes when the two microlens arrays 130 and 140 are kept in different distances. Because the distance between the two microlens arrays 130 and 140 can be adjusted in a relatively short time, the imaging apparatus 100 can implement fast switch between different imaging modes. In addition, compared with a solution that implements mode switch by moving a microlens array into or out of an optical path, this embodiment of the present disclosure has advantages of a compact structure and a light weight.

According to this embodiment of the present disclosure, the main lens 110 is equivalent to a lens or an objective lens of an ordinary camera. The main lens 110 may be a single lens, or may be a system formed by several lenses, and is configured to focus a light ray reflected from a scene. The image sensor 120 may be a photosensitive element such as a charge coupled device (CCD) or a complementary metal-oxide semiconductor (CMOS), and is configured to sense light and convert an optical image into an electrical signal.

It should be understood that, for ease of description, in FIG. 1, for example, the first microlens is a planoconvex lens, and the second microlens is a planoconcave lens. However, this embodiment of the present disclosure is not limited thereto. Alternatively, the first microlens may be a planoconcave lens, and the second microlens may be a planoconvex lens. The planoconcave lens is a lens having a flat surface on one side and a concave surface on the other side. The planoconvex lens is a lens having a flat surface on one side and a convex surface on the other side. A curved surface of the microlens in the two microlens arrays 130 and 140 may be spherical or non-spherical, provided that each first microlens and the corresponding second microlens are in a preset distance and equivalent to a single microlens, and the two microlenses can be attached together.

According to this embodiment of the present disclosure, the first microlenses and the second microlenses may be made of a same optical material. For example, the optical material may be optical plastic or optical glass.

Alternatively, in another embodiment, the first microlens and the second microlens may be made of different optical materials, and a difference between refractive indexes of the optical materials used by the first microlens and the second microlens falls within a range of [−0.01, 0.01]. For example, one of the two microlenses may be made of the optical plastic and the other may be made of the optical glass, provided that the difference between the refractive indexes of the two microlenses is quite small (for example, within the range of [−0.01, 0.01]). Certainly, the two microlenses may use a same type of optical material (for example, both use the optical plastic), but the difference between the refractive indexes of the two microlenses is quite small.

According to this embodiment of the present disclosure, the driving apparatus 150 may be fastened on a housing or a frame (not shown in FIG. 1) of the imaging apparatus 100. The driving apparatus 150 may be connected to at least one of the first microlens array 130 or the second microlens array 140 using a driving mechanism, and is configured to drive at least one of the first microlens array 130 or the second microlens array 140 to move along an optical axis direction. The driving apparatus 150 may be connected to the main lens 110 using the driving mechanism, and is configured to drive the main lens 110 to move along the optical axis direction to implement a focusing function of the imaging apparatus 100. The image sensor 120 may be fastened on the housing or a frame of the imaging apparatus 100, that is, the driving apparatus 150 may be connected to the image sensor 120 using the housing or the frame. However, this is not limited in this embodiment of the present disclosure. When a distance between the image sensor 120 and the microlens arrays 130 and 140 needs to be adjusted, the driving apparatus 150 may also be connected to the image sensor 120 using the driving mechanism in order to drive the image sensor 120 to move along the optical axis direction.

According to this embodiment of the present disclosure, the driving apparatus 150 is configured to adjust the distance between the first microlens array 130 and the second microlens array 140 to a first distance to provide a light field mode. When the first distance is greater than 0, in the light field mode, an incident ray is refracted by the main lens 110, refracted by the first microlens array 130 and the second microlens array 140, and then projected onto the image sensor 120.

Further, when the light field mode is selected or it is determined that the light field mode needs to be enabled, the imaging apparatus 100 leaves a distance between the first microlens array 130 and the second microlens array 140 using the driving apparatus 150 such that the first microlens array 130 and the second microlens array 140 are equivalent to a single microlens array to implement a structure of a light field camera in the imaging apparatus 100. When shooting is performed in the light field mode, an emergent ray of the main lens 110 covers several pixels on the image sensor 120 through an image formed by each first microlens and the corresponding second microlens. An object point on a scene is focused by the main lens 110, light intensity and a direction component are dispersed from a light ray through each first microlens and the corresponding second microlens, and the light ray arrives at different pixels of the image sensor 120 such that light field image information of the object point is obtained from the image sensor 120.

For example, the first distance may be designed to allow an image formed on the image sensor 120 using the first microlens array 130 and the second microlens array 140 to cover all pixels exactly such that a maximum resolution can be obtained in the light field camera mode under a given resolution of the image sensor 120.

Optionally, in another embodiment, a combination of the first microlens array 130 and the second microlens array 140 is equivalent to a third microlens array, that is, the M*N first microlenses and the M*N second microlenses are equivalent to M*N single lenses. The driving apparatus 150 is further configured to adjust a relative location among the main lens 110, the image sensor 120, the first microlens array 130, and the second microlens array 140 to a first relative location such that an imaging plane of the third microlens array is located on a plane on which the image sensor 120 is located, and a main plane of the third microlens array is located on an imaging plane of the main lens 110.

In this embodiment of the present disclosure, two distance-adjustable microlens arrays 130 and 140 may be used to take the place of a third microlens array of a conventional light field camera. When the two microlens arrays 130 and 140 are adjusted to be apart at a preset distance, the imaging apparatus 100 enters the light field mode. In the light field mode, optical performance of the combination of each first microlens and the corresponding second microlens is equivalent to optical performance of a single microlens. Then, a position (or a distance) between the main lens 110 and the image sensor 120 may be adjusted such that the imaging plane of the third microlens array is located on the plane on which the image sensor 120 is located, and the imaging plane of the main lens 110 is located on the main plane of the third microlens array in order to shoot a clear low-resolution light field image.

For example, the imaging apparatus 100 may first adjust the preset distance d between the two microlens arrays using the driving device 150 to enter the light field mode, and then may focus on the main lens 110 according to a conventional focusing technique using the driving device 150 such that the imaging plane of the third microlens array is located on the plane on which the image sensor 120 is located, and the imaging plane of the main lens 110 is located on the main plane of the third microlens array (for details, refer to descriptions of FIG. 3, FIG. 4, FIG. 5, and FIG. 6). When a user presses a shutter, clear light field image information can be generated on the image sensor 120. Herein, the main plane of the third microlens array may be a plane on which an optical center of the third microlens array (that is, equivalent to an optical center of a single lens) is located, as shown by dashed lines between the two microlens arrays 130 and 140 in FIG. 1.

Optionally, in another embodiment, a combination of the first microlens array 130 and the second microlens array 140 is equivalent to a third microlens array, and the driving apparatus 150 is further configured to adjust a relative location among the main lens 110, the image sensor 120, the first microlens array 130, and the second microlens array 140 to a second relative location such that an imaging plane of the third microlens array is located on a plane on which the image sensor 120 is located, and an imaging plane of the main lens 110 is located between the main lens 110 and a main plane of the third microlens array.

In this embodiment of the present disclosure, two distance-adjustable microlens arrays 130 and 140 may be used to take the place of a third microlens array of a conventional light field camera. When the two microlens arrays 130 and 140 are adjusted to be apart at a preset distance, the imaging apparatus 100 enters the light field mode. In the light field mode, optical performance of the combination of each first microlens and the corresponding second microlens is equivalent to optical performance of a single microlens. Then, in the light field mode, a position (or a distance) between the main lens 110 and the image sensor 120 may be adjusted such that the imaging plane of the third microlens array is located on the plane on which the image sensor 120 is located, and the imaging plane of the main lens 110 is located between the main plane of the third microlens array and the main lens 110, that is, located between the main lens 110 and the third microlens array (for details, refer to descriptions of FIG. 7 and FIG. 8) in order to shoot a clear low-resolution light field image. In this way, a light ray entering the imaging apparatus 100 first undergoes primary imaging on the imaging plane of the main lens 110, passes through the first microlens array 130 and the second microlens array 140, and then undergoes secondary imaging on the image sensor 120.

Optionally, in another embodiment, a combination of the first microlens array 130 and the second microlens array 140 is equivalent to a third microlens array, and the driving apparatus 150 is further configured to adjust a relative location among the main lens 110, the image sensor 120, the first microlens array 130, and the second microlens array 140 to a third relative location such that an imaging plane of the third microlens array is located on a plane on which the image sensor 120 is located, and the image sensor 120 is located between a main plane of the third microlens array and an imaging plane of the main lens 110.

In this embodiment of the present disclosure, two distance-adjustable microlens arrays 130 and 140 may be used to take the place of a third microlens array of a conventional light field camera. When the two microlens arrays 130 and 140 are adjusted to be apart at a preset distance, the imaging apparatus 100 enters the light field mode. In the light field mode, a position (or a distance) between the main lens 110 and the image sensor 120 may be adjusted such that the imaging plane of the third microlens array is located on the plane on which the image sensor 120 is located, and the image sensor 120 is located between the main plane of the third microlens array and the imaging plane of the main lens 110, that is, located between the second microlens array 140 and the imaging plane of the main lens 110 in order to shoot a clear low-resolution light field image. In this way, a light ray passing through the main lens 110 is converged once again after passing through the third microlens array such that the light ray is imaged in advance on the image sensor 120 (for details, refer to descriptions in FIG. 9). An advantage of primary imaging is that a distance between the main lens 110 and the image sensor 120 can be designed to be relatively small such that an overall length of the imaging apparatus 100 can be designed to be relatively small.

According to this embodiment of the present disclosure, the driving apparatus 150 is configured to adjust the first microlens array 130 and the second microlens array 140 such that the M*N first microlenses are attached to the M*N second microlenses to provide the non-light-field mode. In the non-light-field mode, an incident ray is refracted by the main lens 110, and directly projected onto the image sensor 120 through the first microlens array 130 and the second microlens array 140.

In this embodiment of the present disclosure, two distance-adjustable microlens arrays 130 and 140 may be used to take the place of a third microlens array of a conventional light field camera. When the two microlens arrays 130 and 140 are adjusted to be attached to each other, the two microlens arrays 130 and 140 are equivalent to a piece of flat glass, and the imaging apparatus 100 enters the non-light-field mode. In this way, an emergent ray from the main lens 110 directly irradiates to the image sensor 120 to form an image.

Optionally, in another embodiment, the driving apparatus 150 is further configured to adjust a relative location among the main lens 110, the image sensor 120, the first microlens array 130, and the second microlens array 140 to a fourth relative location such that an imaging plane of the main lens 110 is located on a plane on which the image sensor 120 is located.

In the non-light-field mode, the drive device 150 may also adjust a position (or a distance) between the main lens 110 and the image sensor 120 such that the imaging plane of the main lens 110 is located on the plane on which the image sensor 120 is located. For example, the main lens 110 is focused on using a conventional focusing technique such that the imaging plane of the main lens 110 is located on the plane on which the image sensor 120 is located to produce a clear high-resolution image on the image sensor 120.

Optionally, in another embodiment, the driving apparatus 150 may also adjust the distance between the first microlens array 130 and the second lens array 140 to a second distance, and adjust the distance between the second lens array 140 and the image sensor 120 to a third distance, where the second distance is greater than 0, and the second distance is less than the first distance.

According to this embodiment of the present disclosure, the distance between the two microlens arrays 130 and 140 can be adjusted by means of finer and more accurate movement amount control such that photographs can be taken more freely and flexibly in an intermediate state between the light field mode and the non-light-field mode. If the two microlens arrays 130 and 140 are closer to the image sensor 120, an image taken by the imaging apparatus 100 is more similar to a high-resolution image taken by a conventional camera. If the two microlens arrays 130 and 140 are farther from the image sensor 120, an image taken by the imaging apparatus 100 is more similar to a low-resolution image taken in the light field mode. When a user requires a higher-resolution light-field image without a quite accurate light field effect (for example, less information about a light ray direction is recorded), the two microlens arrays 130 and 140 may be arranged at a distance close to a distance d1 ($d1<d$), and then the two microlens arrays 130 and 140 are simultaneously moved towards the image sensor 120 by a distance d2. In this case, a high-resolution two-dimensional image with a low light field effect can be taken. In this way, the user can make a trade-off between a resolution and a light field effect to obtain an image having an effect between the non-light-field mode and the light field mode. Therefore, the imaging apparatus 100 can be used more flexibly.

According to this embodiment of the present disclosure, the driving apparatus 150 may be designed to adjust, when powered on, the distance between the first microlens array 130 and the second microlens array 140 to provide the light field mode, and the driving apparatus 150 is designed to adjust, when not powered on, the first microlens array 130 using an elastic element such that the first microlens array 130 is attached to the second microlens array 140 to provide the non-light-field mode.

In other words, the imaging apparatus 100 is set to a second mode using the elastic element, for example, the elastic element may be configured to make the two microlens arrays 130 and 140 attached together by means of elasticity. The imaging apparatus 100 is set to a first mode under the effect of electricity, for example, the two microlens arrays 130 and 140 are driven apart by electricity. Because the non-light-field mode is used more frequently than the light field mode, overall power consumption of the imaging apparatus 100 can be reduced.

Figure 2:
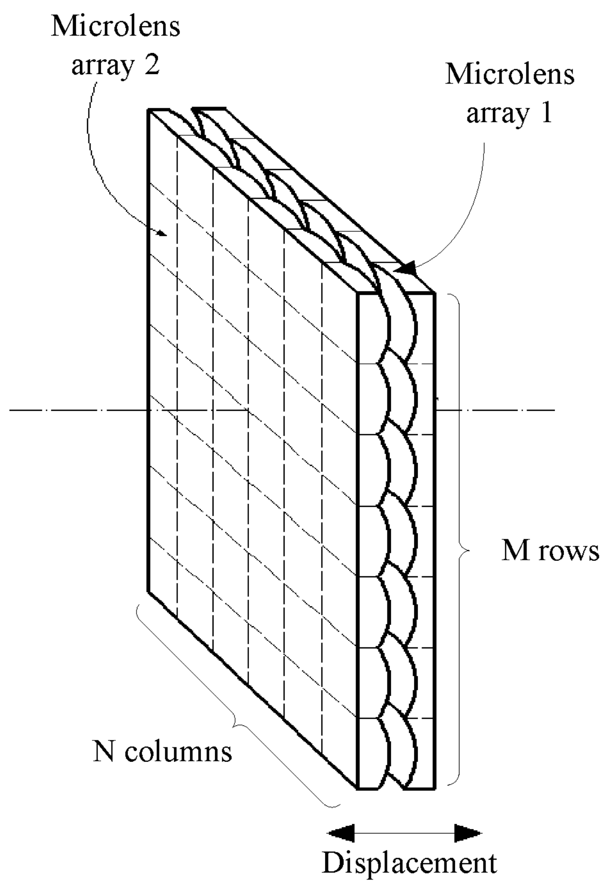
FIG. 2 is a schematic structural diagram of two microlens arrays according to an embodiment of the present disclosure.

FIG. 2 is a schematic structural diagram of two microlens arrays according to an embodiment of the present disclosure. The two microlens arrays include a microlens array 1 and a microlens array 2, corresponding to the first microlens array 130 and the second microlens array 140 in FIG. 1 respectively.

For example, the microlens array 2 may include M*N miniature planoconvex lenses, and the microlens array 1 may include M*N planoconcave lenses. Curved surfaces of the two microlens arrays are opposite to each other, and surfaces back to the curved surfaces of the two microlens arrays are flat surfaces. A concave surface is the same as a convex surface in shape and can be fully attached. As shown in FIG. 2, both the microlens array 1 and the microlens array 2 are arrays of M rows and N columns of microlenses, and at least one of M or N is greater than 1. It should be understood that M may be equal to N, that is, the two microlens arrays may be in a square shape, or M may not be equal to N, that is, the two microlens arrays may be in a rectangular shape.

It should be understood that, in this embodiment of the present disclosure, the planoconvex lens may be located in front of the planoconcave lens. This is not limited in this embodiment of the present disclosure. Alternatively, the planoconcave lens may be located in front of the planoconvex lens according to a design need. In an optical path, an optical element that a light ray enters into first is located in front of an optical element that the light ray enters into later.

The two microlens arrays may be slightly shifted along an optical axis direction, usually within 1 millimeter (mm). The two microlens arrays may be close to or away from each other, or attached together.

The imaging apparatus in this embodiment of the present disclosure may use a main lens of a conventional light field camera or an ordinary camera. This is not limited in this embodiment of the present disclosure.

The imaging apparatus in this embodiment of the present disclosure may use an image sensor of a conventional mobile device, or may use another image sensor or a dedicated image sensor. This is not limited in this embodiment of the present disclosure. At present, a common image sensor has 41 megapixels, a size of 1/1.2 inches ("), an effective size of 10.82 mm×7.52 mm, and a resolution of 7728×5368. If an aperture of a lens is F#2, each microlens of the microlens array covers 49 pixels, and records information of light rays from 49 directions. It can be learned from calculation that a diameter of each microlens may be 9.8 micrometers (μm), and a focal length of each microlens may be 19.6 μm.

For ease of volume molding manufacture, the two microlens arrays may be made of optical plastic that is not easy to deform. For example, in the imaging apparatus of this embodiment of the present disclosure, conventional polymethyl methacrylate (PMMA) (refractive index n=1.49) optical plastic may be used as a material for producing a microlens. According to a result of simulation performed using optical design software, optical performance of the microlens made from the foregoing material approximates a diffraction limit, and a spot diameter is smaller than the Airy disk. Therefore, imaging quality can meet a design requirement. For example, Table 1 lists design parameters of a microlens surface.

TABLE 1

Surface type parameters of a microlens

| Surface | Type | Radius (mm) | Thickness (mm) | Aperture (mm) |
|---|---|---|---|---|
| 1 | Spherical | 0.012095 | 0.01 | 0.01 |
| 2 | Spherical | −0.037402 | 0.013372 | 0.01 |

Polystyrene (i.e., POLYSTYR, n=1.59) optical plastic with a higher refractive index may alternatively be selected as a material for a combination of microlens arrays in this embodiment of the present disclosure. In addition, a type of the microlens in this embodiment of the present disclosure is not limited to a spherical surface. Alternatively, an aspheric surface may be used to increase a degree of design freedom. For example, a plastic molding technology may be used to manufacture a high-order aspheric surface. Optical performance of such a microlens can achieve imaging quality approximate to that of a single lens, a spot is within the Airy disk, and optical quality can meet a design requirement. For example, a curved surface of the microlens may be an even aspheric surface, an aspheric equation is shown below, and design parameters of the microlens surface are listed in Table 2.

$$z=\frac{cr^2}{1+\sqrt{1-(1+k)c^2r^2}}+\alpha_1 r^2+\alpha_2 r^4+\alpha_3 r^6+\ldots\ \alpha_n r^{2n},$$

where n=3, 1/c=−8.384902E−003, c=1.162762, $\alpha_1$=0, $\alpha_2$=4.499148E+005, and $\alpha_3$=1.435782E+010.

TABLE 2

Surface type parameters of a microlens combination

| Surface | Type | Radius | Thickness (mm) | Aperture (mm) |
|---|---|---|---|---|
| 1 | Flat | Infinity | 0.01 | 0.01 |
| 2 | Even aspherical | −0.0084 | 0.0068 | 0.01 |
| 3 | Even aspherical | −0.0084 | 0.0059 | 0.01 |
| 4 | Flat | Infinity | 0.0054 | 0.01 |

Based on the size of the image sensor, a size of the microlens may be designed to be greater than 10.82 mm×7.52 mm. For example, a quantity of microlenses may be at least 1082×752. When an array of 1200×800 microlenses is made with a margin at an edge, the size of the microlenses may be 12 mm×8 mm. In this case, a distance between the microlens array 1 and the image sensor is 28 μm, a distance between the microlens array 2 and the image sensor is 5.4 μm, and a distance between the two microlens arrays is d=6.8 μm.

In this embodiment of the present disclosure, a simple structure is used to implement fast switch between a light field mode and a non-light-field mode in primary imaging. When a user needs to shoot a light field image, the imaging apparatus may be switched to the light field mode. When the user needs to shoot a high-resolution non-light-field image, the camera may be switched to the non-light-field mode. This extends an application scope of a camera and supports more flexible use of the camera.

The imaging apparatus in this embodiment of the present disclosure features a compact structure, a small volume, a light weight, and a short switch time. In addition, the microlens arrays in this embodiment of the present disclosure may be made of common optical plastic or optical glass, instead of a special optical material. In addition, the microlens arrays required for this embodiment of the present disclosure can be produced and processed using a micromachining technology.

Figure 3:
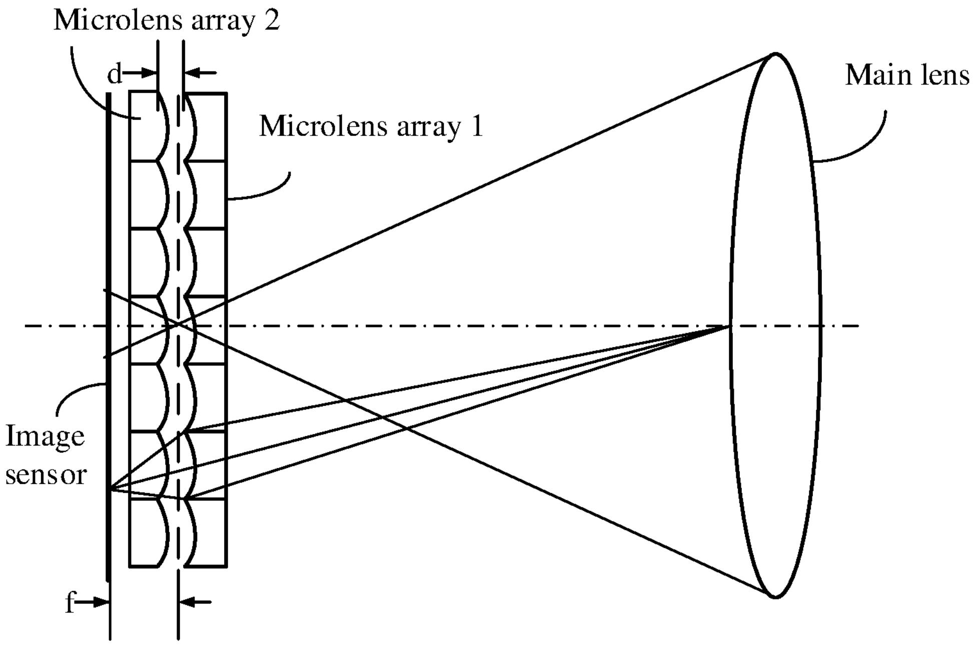
FIG. 3 is a schematic diagram of an imaging principle of an imaging apparatus in a light field mode according to another embodiment of the present disclosure.
Figure 4:
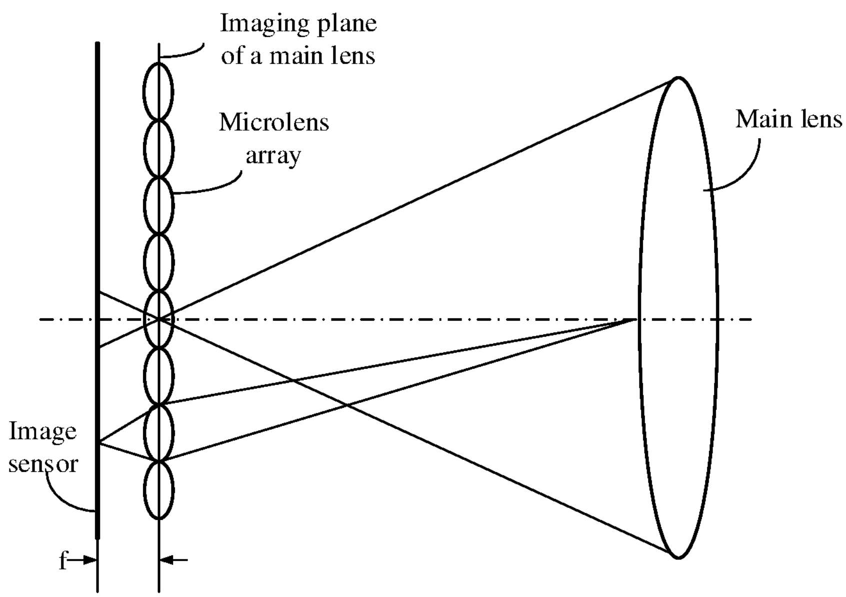
FIG. 4 is a schematic diagram of an equivalent imaging principle of an imaging apparatus in a light field mode according to another embodiment of the present disclosure.
Figure 5:
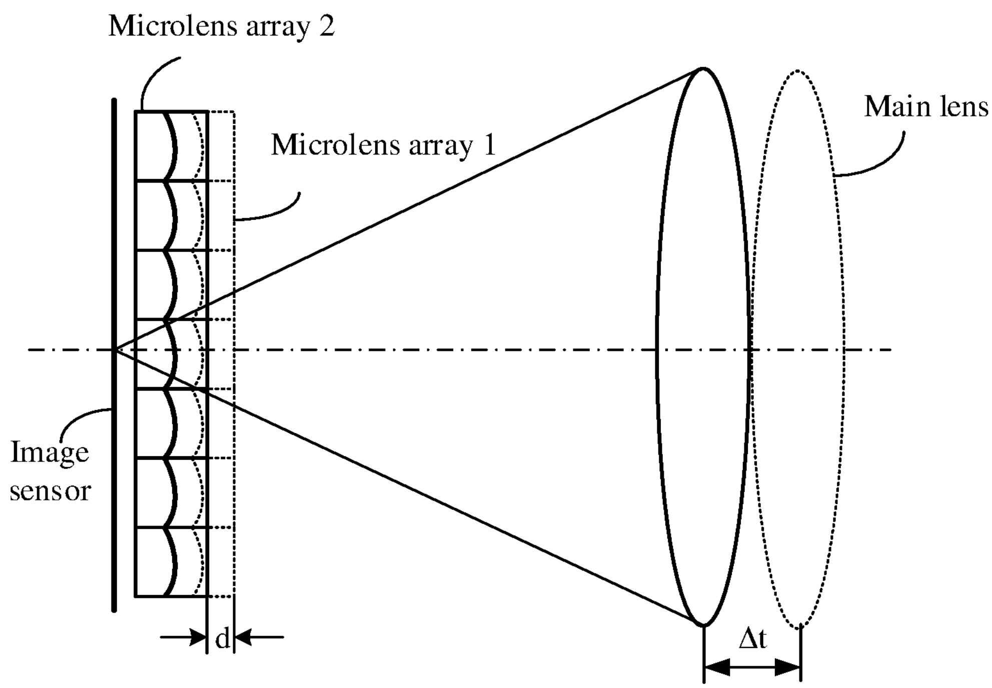
FIG. 5 is a schematic diagram of an imaging principle of an imaging apparatus in a non-light-field mode according to another embodiment of the present disclosure.
Figure 6:
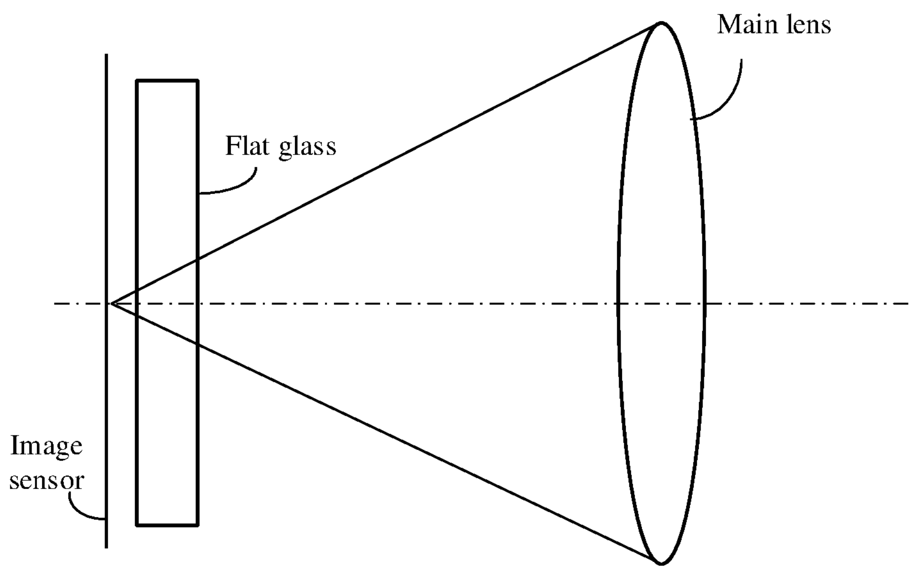
FIG. 6 is a schematic diagram of an equivalent imaging principle of an imaging apparatus in a non-light-field mode according to another embodiment of the present disclosure.

FIG. 3 is a schematic diagram of an imaging principle of an imaging apparatus in a light field mode according to another embodiment of the present disclosure. FIG. 4 is a schematic diagram of an equivalent imaging principle of an imaging apparatus in a light field mode according to another embodiment of the present disclosure. FIG. 5 is a schematic diagram of an imaging principle of an imaging apparatus in a non-light-field mode according to another embodiment of the present disclosure. FIG. 6 is a schematic diagram of an equivalent imaging principle of an imaging apparatus in a non-light-field mode according to an embodiment of the present disclosure.

In this embodiment, two microlens arrays are used to replace a third microlens array of a conventional light field camera, that is, the two microlens arrays are disposed at a location of the third microlens array of the conventional light field camera to implement, together with a main lens of the light field camera, the light field mode of the camera. A parameter design of a microlens is related only to a numerical aperture of the main lens and a parameter of an image sensor, and is unrelated to other parameters of the main lens. Therefore, shooting in light field mode can be implemented after the third microlens array of the conventional light field camera is replaced with the two microlens arrays of this solution.

Referring to FIG. 3, the two microlens arrays include a microlens array 1 and a microlens array 2. In this embodiment, that the microlens array 1 includes a planoconcave lens and the microlens array 2 includes a planoconvex lens is used as an example for description. It should be understood that this embodiment of the present disclosure is not limited thereto. Alternatively, the microlens array 1 may include a planoconvex lens and the microlens array 2 may include a planoconcave lens. In this embodiment, the microlens array 1 is disposed in front of the microlens array 2, that is, a light ray from the main lens enters the microlens array 1 first and then enters the microlens array 2.

A combination of a first microlens array and a second microlens array is equivalent to a third microlens array, that is, M*N first microlenses and M*N second microlenses are equivalent to M*N single lenses. It is assumed that a focal length of the equivalent single lens is f, and an image sensor may be located at a focal point of the equivalent single lens in the third microlens array, that is, a distance between the equivalent single lens and the image sensor is f. A distance between the microlens array 1 and the microlens array 2 may vary between 0 and d. In the light field mode, the spacing between the microlens array 1 and the microlens array 2 is d, and the main lens is adjusted for focusing such that a main plane of the third microlens array is located on an imaging plane of the main lens, or an imaging plane of the main lens is located on a main plane of the third microlens array.

Referring to FIG. 4, in the light field mode, the imaging apparatus in this embodiment may be equivalent to a conventional light field camera using a third microlens array with a focal length f. The third microlens array is located on an imaging plane of a main lens, and an image is imaged on an image sensor using a microlens in the microlens array.

Referring to FIG. 5, when a user selects the non-light-field mode, a driving apparatus of the imaging apparatus may move the microlens array 1 to the left by d such that the microlens array 1 is attached to the microlens array 2, and the imaging apparatus enters the non-light-field mode. The microlens array 1 and the microlens array 2 are equivalent to a piece of flat glass, and a light ray is not deflected or reflected after passing through the two microlens arrays, as shown in FIG. 6. In this case, the main lens may be moved to the left by Δt in a focusing process such that an image is clearly imaged on the image sensor to obtain a high-resolution image. On the contrary, when the user selects the light field mode, the driving apparatus of the imaging apparatus may move the microlens array 1 to the right by d such that there is a distance d between the microlens array 1 and the microlens array 2, and the imaging apparatus enters the light field mode. In this case, the main lens may be moved to the right by Δt in a focusing process in order to obtain a clear light field image.

Therefore, fast switch between the light field mode and the non-light-field mode can be implemented in one camera by means of a fast and tiny displacement along an optical axis direction of the imaging apparatus.

Figure 7:
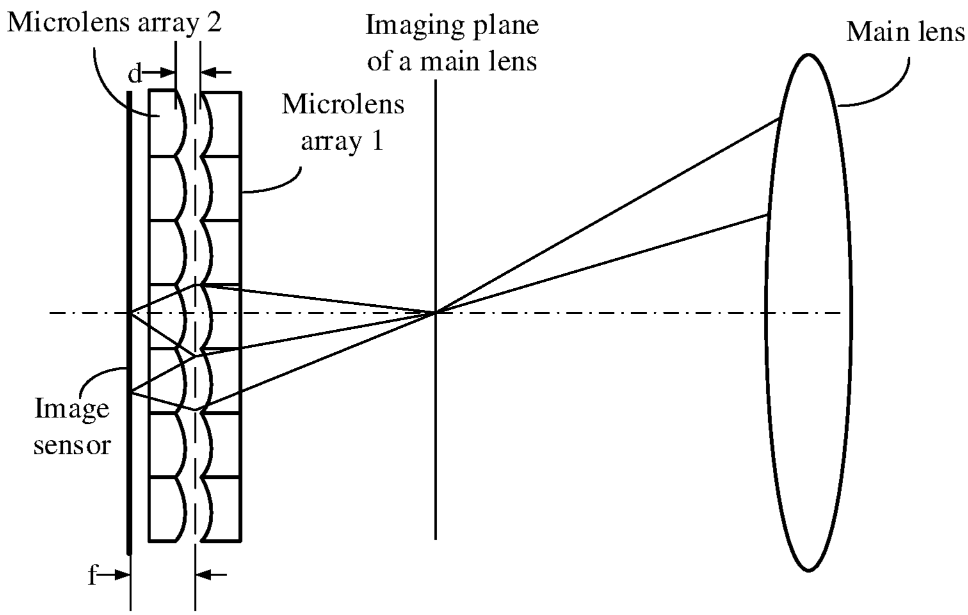
FIG. 7 is a schematic diagram of an imaging principle of an imaging apparatus according to another embodiment of the present disclosure.
Figure 8:
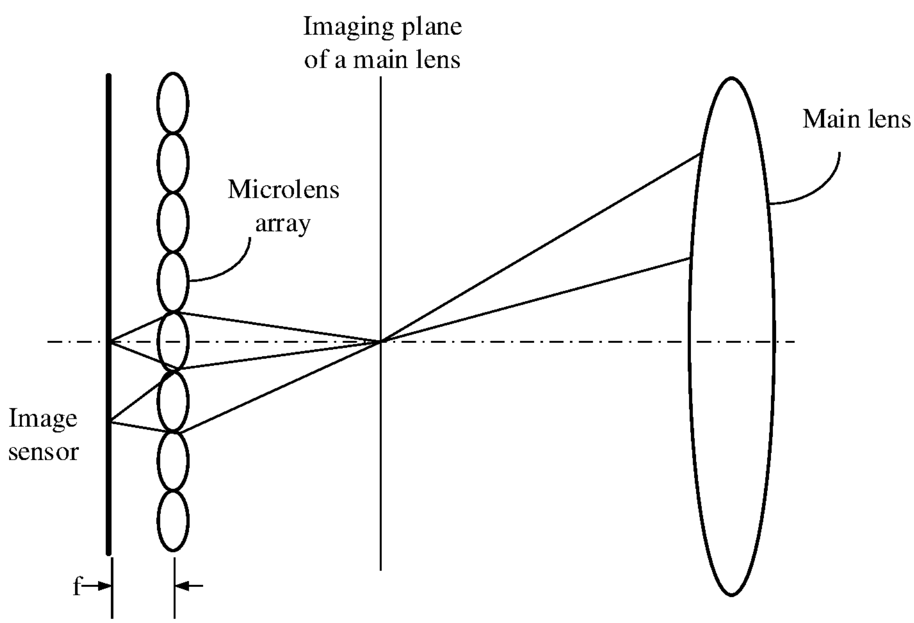
FIG. 8 is a schematic diagram of an equivalent imaging principle of an imaging apparatus in a light field mode according to another embodiment of the present disclosure.

FIG. 7 is a schematic diagram of an imaging principle of an imaging apparatus according to another embodiment of the present disclosure. FIG. 8 is a schematic diagram of an equivalent imaging principle of an imaging apparatus in a light field mode according to another embodiment of the present disclosure.

The embodiment of FIG. 7 is similar to the embodiment of FIG. 3. A difference lies in that, in this embodiment, in a light field mode, the imaging plane of the main lens is located in front of the microlens arrays. In this case, a light field image can also be shot, and such a camera is also referred to as a secondary-imaging-based light field camera. Referring to FIG. 8, an image imaged by a main lens is imaged on an image sensor by microlens arrays after secondary imaging.

When the user selects the non-light-field mode, the driving apparatus of the imaging apparatus may move the microlens array 1 to the left until the microlens array 1 is attached to the microlens array 2, and the two microlens arrays can be equivalent to flat glass. In this case, the camera is in the non-light-field mode. Then, the main lens is moved to the left by a specific distance in order to shoot a clear high-resolution image. On the contrary, when the user selects the light field mode, the driving apparatus of the imaging apparatus may move the microlens array 1 to the right by a specific distance such that there is a distance between the microlens array 1 and the microlens array 2, and the imaging apparatus enters the light field mode. In this case, the main lens may be moved to the right by a specific distance in a focusing process in order to obtain a clear light field image.

Figure 9:
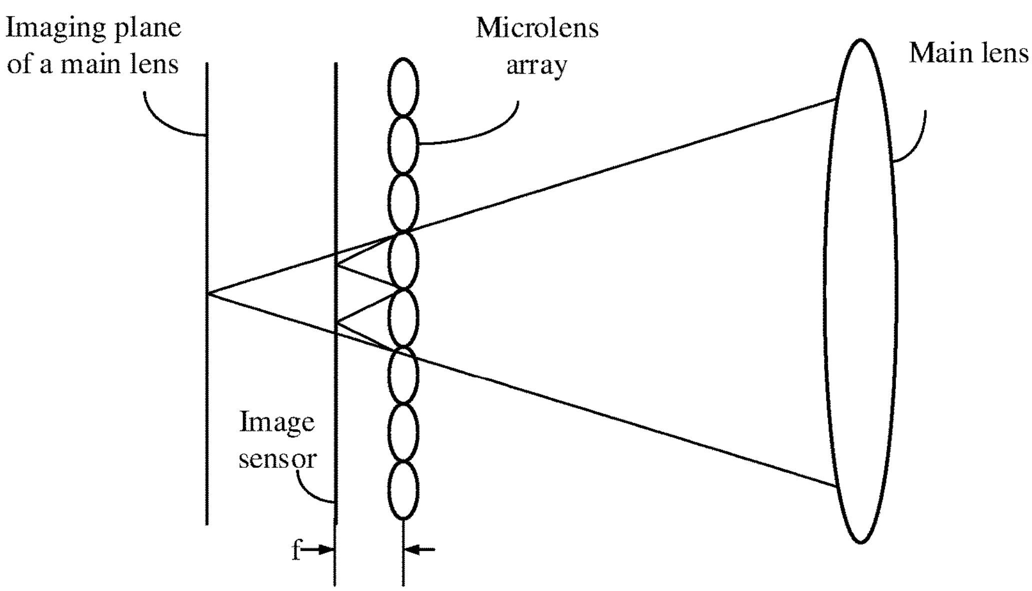
FIG. 9 is a schematic diagram of an equivalent imaging principle of an imaging apparatus in a light field mode according to another embodiment of the present disclosure.

FIG. 9 is a schematic diagram of an equivalent imaging principle of an imaging apparatus in a light field mode according to another embodiment of the present disclosure.

The embodiment of FIG. 9 is similar to the embodiment of FIG. 3. A difference lies in that, in this embodiment, an imaging plane of a main lens may be located behind microlens arrays. In this case, a light field image can also be shot, and such an imaging apparatus is also referred to as a primary-imaging-based light field camera. Referring to FIG.

9, a light ray passing through the main lens passes through the microlens arrays and then is converged once again such that the light ray is imaged on the image sensor in advance. An advantage of such a camera lies in that a distance between the main lens and the image sensor can be designed to be small such that an overall length of the imaging apparatus is relatively small.

When the user selects the non-light-field mode, the driving apparatus of the imaging apparatus may move the microlens array 1 to the left until the microlens array 1 is attached to the microlens array 2, and the two microlens arrays can be equivalent to flat glass. In this case, the camera is in the non-light-field mode. Then, the main lens is moved to the right by a specific distance in order to shoot a clear high-resolution image. On the contrary, when the user selects the light field mode, the driving apparatus of the imaging apparatus may move the microlens array 1 to the right by a specific distance such that there is a distance between the microlens array 1 and the microlens array 2, and the imaging apparatus enters the light field mode. In this case, the main lens may be moved to the left by a specific distance in a focusing process in order to obtain a clear light field image.

Figure 10:
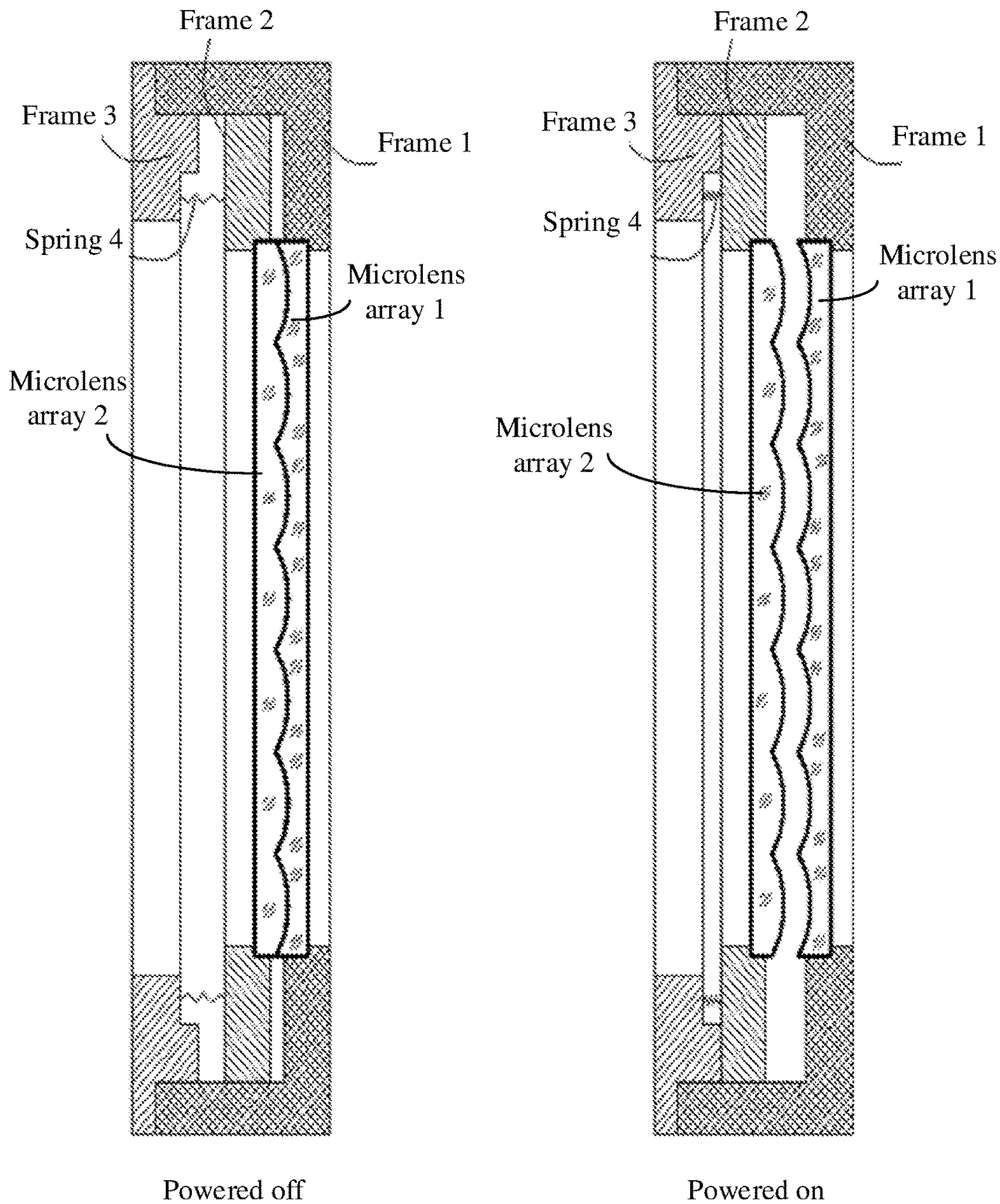
FIG. 10 is a schematic structural diagram of a combination of microlens arrays according to an embodiment of the present disclosure.

FIG. 10 is a schematic structural diagram of a combination of microlens arrays according to an embodiment of the present disclosure. The combination of microlens arrays of FIG. 10 is an example of a combination of two microlens arrays of FIG. 1.

For example, the combination of microlens arrays includes a microlens array 1 and a microlens array 2. An installation mechanism of the combination of the microlens array includes a frame 1, a frame 2, and a frame 3. The frame 2 and the frame 3 are metal frames, and a spring is disposed between the frame 2 and the frame 3. The microlens array 1 is disposed on the frame 1, and the microlens array 2 is disposed on the frame 2. In a light field mode, the frame 2 or the frame 3 is controlled to be powered on such that the frame 2 is drawn toward the frame 3, and there is a distance d between the microlens array 1 and the microlens array 2. In a non-light-field mode, neither the frame 2 nor the frame 3 are powered on, and a spring force of the spring pushes the frame 2 toward the frame 1 such that the microlens array 1 is attached to the microlens array 2.

The frame 1, the frame 2, and the frame 3 may be rectangular, or may be circular or in another shape. This is not limited in this embodiment of the present disclosure. Middle parts of the frame 1, the frame 2, and the frame 3 may be hollowed such that a light ray can pass through the two microlens arrays. As shown in FIG. 10, a planoconvex lens may be placed in the metal frame 2, and a planoconcave lens may be placed in the frame 1. Alternatively, the planoconvex lens may be placed in the metal frame 1, and the planoconcave lens may be placed in the frame 2. The frame 2 can be horizontally slid in the frame 1, the frame 3 is configured to prevent the frame 2 from slipping out of the frame 1, and the frame 3 and the frame 1 are firmly bonded. There are four springs at four corners between the frame 3 and the frame 2, connecting the two frames. In the non-light-field mode, the frame 3 and the frame 2 are powered off, and the springs are in a relaxed state to push the frame 2 toward the frame 1, until the planoconvex lens and the planoconcave lens are attached together. In the light field mode, after the frame 3 or the frame 2 is powered on and a magnetic field is generated, the frame 2 is drawn by the frame 3 until the frame 2 is attached to an end face of the frame 3. In this case, the springs are compressed. The camera is infrequently used in the light field mode, but is frequently used in the non-light-field mode. Therefore, the frames are powered on in the light field mode and powered off in the non-light-field mode such that power consumption can be reduced.

Figure 11:
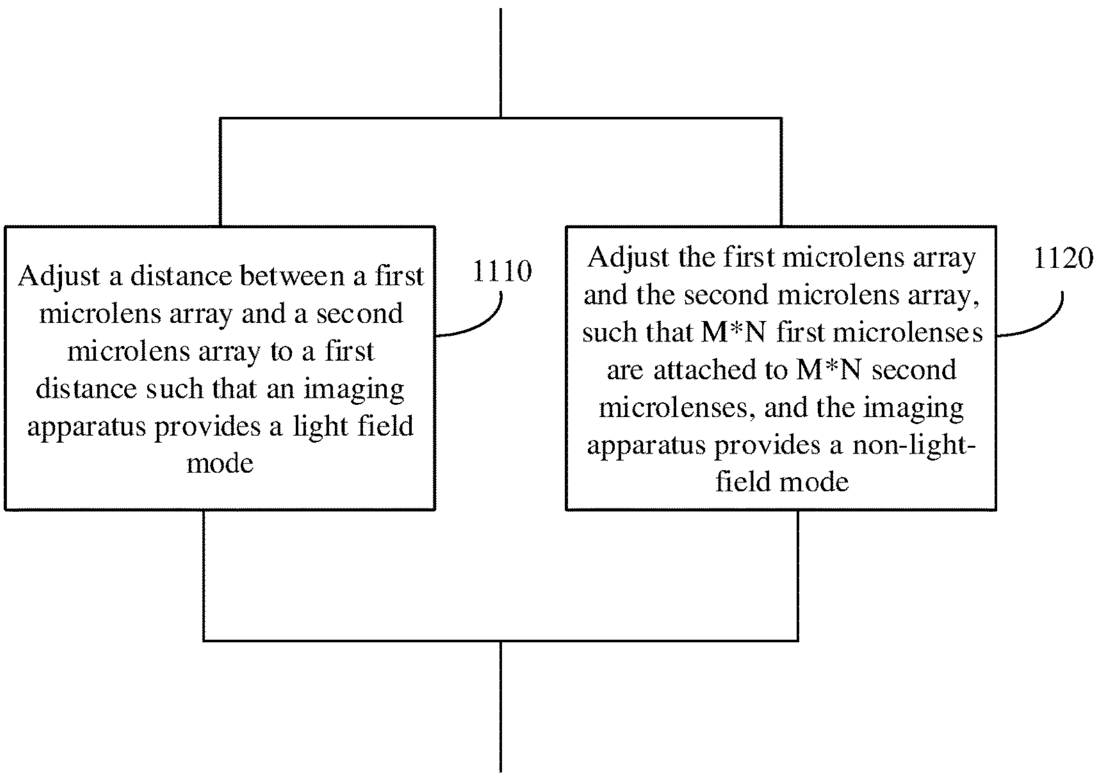
FIG. 11 is a schematic flowchart of an imaging method according to an embodiment of the present disclosure.

FIG. 11 is a schematic flowchart of an imaging method according to an embodiment of the present disclosure. The method of FIG. 11 may be applied to the imaging apparatus of the foregoing embodiment.

The imaging apparatus may include a main lens, an image sensor, a first microlens array, a second microlens array, and a driving apparatus. The first microlens array and the second microlens array are disposed between the main lens and the image sensor, the first microlens array is disposed between the second microlens array and the main lens, the first microlens array is arranged parallel with the second microlens array, the first microlens array includes M*N first microlenses, and the second microlens array includes M*N second microlenses. If the first microlens is a planoconcave lens, the second microlens is a planoconvex lens, and if the first microlens is a planoconvex lens, the second microlens is a planoconcave lens. The M*N first microlenses are in a one-to-one correspondence to the M*N second microlenses in a concave-convex manner. M and N are positive integers, and at least one of M or N is greater than 1. The driving apparatus is connected to the main lens, the image sensor, the first microlens array, and the second microlens array, and is configured to adjust a distance between the first microlens array and the second microlens array.

The imaging method of FIG. 11 may include the following content.

Step 1110: Adjust the distance between the first microlens array and the second microlens array to a first distance such that the imaging apparatus provides a light field mode, where the first distance is greater than 0, and in the light field mode, an incident ray is refracted by the main lens, refracted by the first microlens array and the second microlens array, and then projected onto the image sensor.

Step 1120: Adjust the first microlens array and the second microlens array such that the M*N first microlenses are attached to the M*N second microlenses, and the imaging apparatus provides a non-light-field mode, where in the non-light-field mode, an incident ray is refracted by the main lens, and directly projected onto the image sensor through the first microlens array and the second microlens array.

Further, when the light field mode is selected, the imaging apparatus may keep a preset distance between the two microlens arrays using the driving apparatus in order to enter the light field mode. When the non-light-field mode is selected, the imaging apparatus may make, using the driving apparatus, the two microlens arrays attached together in order to enter the non-light-field mode.

According to this embodiment of the present disclosure, two distance-adjustable microlens arrays that are opposite to each other in a concave-convex manner are disposed between the main lens and the image sensor of the imaging apparatus such that the imaging apparatus can be in different shooting modes when the two microlens arrays are in different distances. Because the distance between the two microlens arrays can be adjusted in a relatively short time, the imaging apparatus can implement fast switch between different imaging modes.

Optionally, in another embodiment, a combination of the first microlens array and the second microlens array is equivalent to a third microlens array. The imaging method of FIG. 11 further includes adjusting a relative location among the main lens, the image sensor, the first microlens array, and the second microlens array to a first relative location in the light field mode such that an imaging plane of the third microlens array is located on a plane on which the image sensor is located, and a main plane of the third microlens array is located on an imaging plane of the main lens.

Optionally, in another embodiment, a combination of the first microlens array and the second microlens array is equivalent to a third microlens array. The imaging method of FIG. 11 further includes adjusting a relative location among the main lens, the image sensor, the first microlens array, and the second microlens array to a second relative location in the light field mode such that an imaging plane of the third microlens array is located on a plane on which the image sensor is located, and an imaging plane of the main lens is located between the main lens and a main plane of the third microlens array.

Optionally, in another embodiment, a combination of the first microlens array and the second microlens array is equivalent to a third microlens array. The imaging method of FIG. 11 further includes adjusting a relative location among the main lens, the image sensor, the first microlens array, and the second microlens array to a third relative location in the light field mode such that an imaging plane of the third microlens array is located on a plane on which the image sensor is located, and the image sensor is located between a main plane of the third microlens array and an imaging plane of the main lens.

According to this embodiment of the present disclosure, in the non-light-field mode, a relative location among the main lens, the image sensor, the first microlens array, and the second microlens array is adjusted to a fourth relative location such that an imaging plane of the main lens is located on a plane on which the image sensor is located.

According to this embodiment of the present disclosure, the first microlenses and the second microlenses are made of a same optical material.

According to this embodiment of the present disclosure, the first microlens and the second microlens are made of different optical materials, and a difference between refractive indexes of the optical materials used by the first microlens and the second microlens falls within a range of [−0.01, 0.01].

Figure 12:
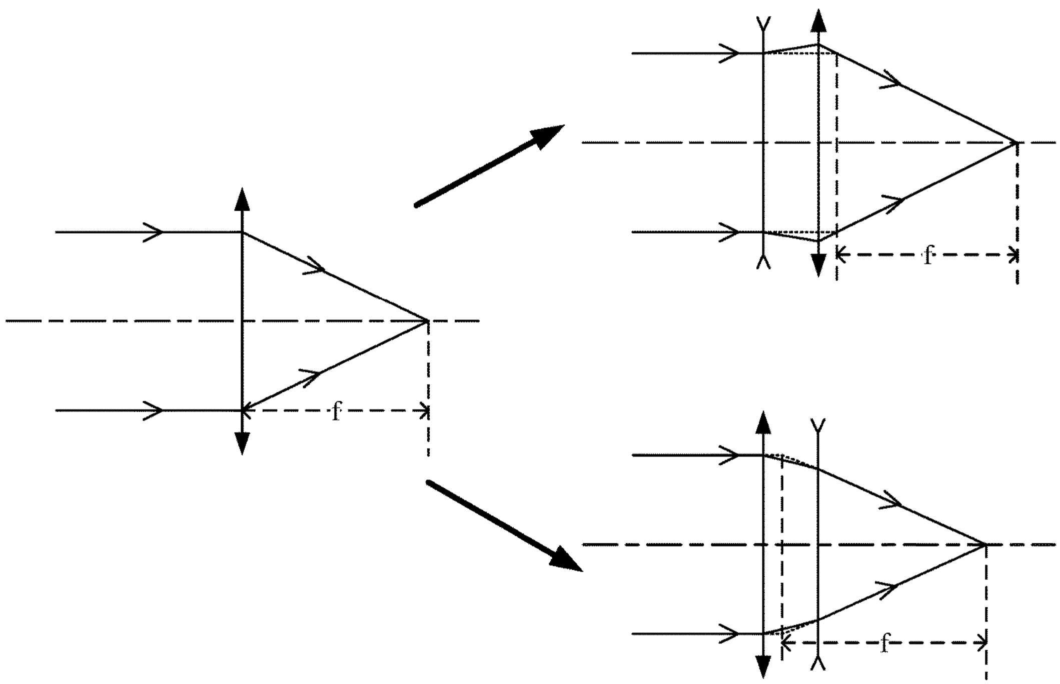
FIG. 12 is a schematic principle diagram of two lenses equivalent to a single lens.

FIG. 12 is a schematic principle diagram of two lenses equivalent to a single lens.

This embodiment of the present disclosure is based on an optical principle that a single lens can substantially be equivalent to a combination of several lenses of different focal powers. Lenses with same optical parameters (for example, a viewing angle, an aperture, and a focal length) can be implemented using a combination of lenses of different quantities and types. Although focal powers of different lenses are different, a total focal power can be equal. Referring to first image on left in FIG. 12, a focal length of a single lens is f, and the single lens can be equivalent to a concave lens and a convex lens in right top image or right bottom image in FIG. 12, and positions of the concave lens and the convex lens are interchangeable. It can be learned from a paraxial imaging formula that:

$$\frac{1}{f} = \frac{1}{f_1} + \frac{1}{f_2} - \frac{d}{f_1 f_2},$$

where d is a spacing between two lenses, and $f_1$ and $f_2$ are focal lengths of the two lenses.

Therefore, to obtain a focal power with a focal length of f, there may be multiple permutations and combinations of $f_1$, $f_2$, and d, and there are infinitely many solutions. If more lenses are used, more combinations can be obtained. This provides greater freedom for a designer, and a greater numerical aperture and a higher resolution are obtained.

When two separated lenses are used, an optical power and a numerical aperture the same as those of a single lens can be obtained, and an imaging effect the same as that of the single lens is achieved. For example, if the two lenses are placed on one axis, a light ray first passes through a planoconvex lens, and then passes through the planoconcave lens. The two lenses are in a specific distance, curved surfaces are opposite inner surfaces between the two lenses, and flat surfaces are outer surfaces between the two lenses. It can be learned from the foregoing imaging formula that focal lengths of the two lenses are:

$$f_1 = -\frac{r_1}{n_1 - 1}, r_1 < 0 \qquad f_2 = -\frac{r_2}{n_2 - 1}, r_2 < 0,$$

where $r_1$ and $n_1$ are a radius of curvature and a refractive index of the planoconvex lens, respectively, and $r_2$ and $n_2$ are a radius of curvature and a refractive index of the planoconcave lens, respectively.

If the two lenses have a center-to-air distance d in an axial direction, it can be learned from a paraxial imaging formula of a lens combination that an equivalent focal length f of the two lenses, $f_1$, and $f_2$ meet the following relationship:

$$\frac{1}{f} = -\frac{n_1 - 1}{r_1} + \frac{n_2 - 1}{r_2} + \frac{(n_1 - 1)(n_2 - 1)}{r_1 r_2} d.$$

From a perspective of optical parameters, performance of the combination of the two lenses is equivalent to performance of a single lens, and the two lenses have more optimized parameters. Surface types are not unique, and optimization can be made according to imaging quality, manufacturing difficulty, a center thickness limit, or the like, to obtain a compromised group of solutions. In addition, it can be learned from the paraxial imaging formula that, because one surface is flat, thicknesses of the two lenses have no effect on focal powers. It can be learned from simulation in an actual simulation process that an effect of the thicknesses on final imaging quality is also quite small.

If absolute values of the radiuses of curvature of concave and convex surfaces of the two lenses are the same, and materials are the same, the foregoing formula of the equivalent focal length f can be simplified as $$\frac{1}{f} = \left(\frac{n-1}{r}\right)^2 d,$$

where $n=n_1=n_2$, and $r=|r_1|=|r_2|$.

In this way, the equivalent focal length of the lens combination may be determined by the radiuses of curvature and the spacing between the two lenses, and optical parameters of the lens combination are also equivalent to those of double convex lenses. In this case, if the two lenses moves close to each other until the two lenses are attached together, because the two lenses are made of the same material, it can be learned from the foregoing formula that, a focal length of the lens combination is infinite, that is, the lens combination is equivalent to a flat plate. In this case, almost no light ray is bent.

It can be learned from the foregoing that, if a group of lenses is designed according to the above method, the lens group can switch from a state of no focal power to a state of a focal length f by adjusting a distance between the two lenses from 0 to d. In this way, switch between the two shooting modes in the embodiments of the disclosure is implemented.

Figure 13:
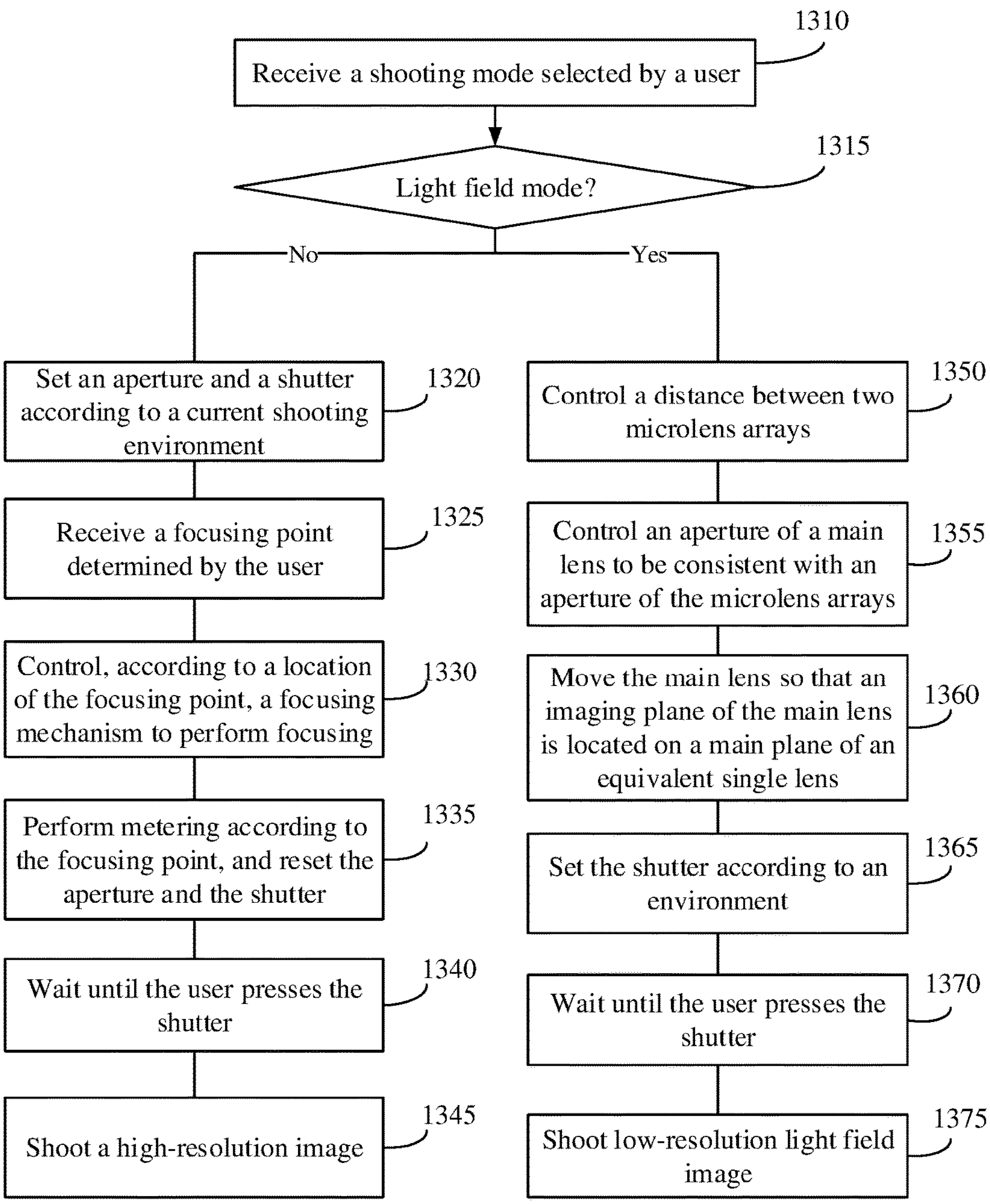
FIG. 13 is a schematic flowchart of an imaging method according to another embodiment of the present disclosure.

FIG. 13 is a schematic flowchart of an imaging method according to another embodiment of the present disclosure.

This embodiment is described using a camera supporting two shooting modes as an example. For example, the camera of this embodiment can switch between a non-light-field mode and a light field mode.

Step 1310: The camera receives a shooting mode selected by a user.

The user of the camera can select, using a button on the camera or a key on a user interface, the non-light-field mode or the light field mode for shooting. When the user selects the non-light-field mode, the user can shoot a high-resolution image as if the user shoots using an ordinary camera. When the user selects the light field mode, the user can shoot a light field image as if the user shoots using a light field camera.

In this embodiment, two microlens arrays of the camera are connected to an electric driving apparatus, and an elastic element (for example, a spring) is disposed between the two microlens arrays.

Step 1315: The camera determines whether the light field mode or the non-light-field mode is selected by the user. If the user selects the non-light-field mode, steps 1320 to 1345 are performed. If the user selects the light field mode, steps 1350 to 1375 are performed.

Step 1320: When the user selects the non-light-field mode, the camera can set an aperture and a shutter according to a current shooting environment.

In this embodiment, it is assumed that when the camera is not powered on, the two microlens arrays are attached together. In the non-light-field mode, if the two microlens arrays are not attached together, that is, there is a specific distance between the two microlens arrays, after the user selects the non-light-field mode, the camera first controls, using a driving apparatus, the two microlens arrays to be attached together, and then performs a function of an ordinary camera. For example, by powering off the electric driving apparatus and by taking advantage of an elastic force of the elastic element, an imaging apparatus makes the two microlens arrays attached together in order to implement the function of the ordinary camera.

Step 1325: The camera receives a focusing point determined by the user.

Step 1330: The camera controls, according to a location of the focusing point determined by the user, a focus mechanism for focusing.

Step 1335: The camera performs metering according to the focusing point, and resets the aperture and the shutter.

Step 1340: The camera waits until the user presses the shutter.

Step 1345: After the user presses the shutter, the camera shoots a high-resolution image.

It should be understood that, in a normal mode of this embodiment, a function of the camera is similar to that of the ordinary camera, and details are not described herein again. Steps 1325 to 1345 merely describe functions of an ordinary camera, and this embodiment of the present disclosure is not limited thereto.

Step 1350: When the user selects the light field mode, the camera may control a distance between two microlens arrays.

In the light field mode, the two microlens arrays are kept in a specific distance by powering on the electric driving apparatus in order to implement a function of a light field camera. When the user selects the light field mode, if the two microlens arrays are attached together, that is, the distance between the two microlens arrays is zero, the camera first controls the two microlens arrays to be apart at a specific distance, and then performs the function of the light field camera.

Step 1355: The camera controls an aperture of a main lens to be consistent with an aperture of the microlens arrays.

Step 1360: The camera moves the main lens so that an imaging plane of the main lens is located on a main plane of an equivalent single lens.

A combination of two corresponding microlenses in the two microlens arrays is equivalent to a single lens. The main plane may alternatively be a plane on which an optical center of the equivalent single lens is located.

Step 1365: The camera sets the shutter according to an environment.

Step 1370: The camera waits until the user presses the shutter.

Step 1375: After the user presses the shutter, the camera shoots a low-resolution light field image.

It should be understood that, a function of the light field camera of this embodiment is similar to a function of a conventional light field camera, and details are not described herein again. Steps 1355 to 1375 merely describe a function of a light field camera, and this embodiment of the present disclosure is not limited thereto.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a portable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An imaging apparatus, comprising:

a main lens;

an image sensor;

a first microlens array;

a second microlens array; and a driving apparatus, wherein the first microlens array and the second microlens array are disposed between the main lens and the image sensor, wherein the first microlens array is disposed between the second microlens array and the main lens, wherein the first microlens array is arranged in parallel with the second microlens array, wherein the first microlens array comprises M*N first microlenses, wherein the second microlens array comprises M*N second microlenses, wherein a second microlens comprises a planoconvex lens when a first microlens comprises a planoconcave lens, wherein the second microlens comprises the planoconcave lens when the first microlens comprises the planoconvex lens, wherein the M*N first microlenses are in a one-to-one correspondence to the M*N second microlenses in a concave-convex manner, wherein M and N are positive integers, wherein at least one of M or N is greater than one, and wherein the driving apparatus is coupled to the main lens, the image sensor, the first microlens array and the second microlens array, and is configured to adjust a distance between the first microlens array and the second microlens array.

2. The imaging apparatus according to claim 1, wherein the driving apparatus is further configured to adjust the distance between the first microlens array and the second microlens array to a first distance to provide a light field mode, wherein the first distance is greater than zero, and wherein in the light field mode, an incident ray is first refracted from the main lens, second refracted from the first microlens array and the second microlens array, and then projected onto the image sensor.

3. The imaging apparatus according to claim 2, wherein a combination of the first microlens array and the second microlens array is equivalent to a third microlens array, wherein the driving apparatus is further configured to adjust a relative location among the main lens, the image sensor, the first microlens array and the second microlens array to a first relative location, and wherein after adjusting, an imaging plane of the third microlens array is located on a plane on which the image sensor is located, and a main plane of the third microlens array is located on an imaging plane of the main lens.

4. The imaging apparatus according to claim 2, wherein a combination of the first microlens array and the second microlens array is equivalent to a third microlens array, wherein the driving apparatus is further configured to adjust a relative location among the main lens, the image sensor, the first microlens array, and the second microlens array to a second relative location, and wherein after adjusting, an imaging plane of the third microlens array is located on a plane on which the image sensor is located, and an imaging plane of the main lens is located between the main lens and a main plane of the third microlens array.

5. The imaging apparatus according to claim 2, wherein a combination of the first microlens array and the second microlens array is equivalent to a third microlens array, wherein the driving apparatus is further configured to adjust a relative location among the main lens, the image sensor, the first microlens array and the second microlens array to a third relative location, and wherein after adjusting, an imaging plane of the third microlens array is located on a plane on which the image sensor is located, and the image sensor is located between a main plane of the third microlens array and an imaging plane of the main lens.

6. The imaging apparatus according to claim 1, wherein the driving apparatus is further configured to adjust the first microlens array and the second microlens array such that the M*N first microlenses are attached to the M*N second microlenses to provide a non-light-field mode, and wherein in the non-light-field mode, an incident ray is refracted from the main lens and directly projected onto the image sensor through the first microlens array and the second microlens array.

7. The imaging apparatus according to claim 6, wherein the driving apparatus is further configured to adjust a relative location among the main lens, the image sensor, the first microlens array and the second microlens array to a fourth relative location, and wherein after adjusting, an imaging plane of the main lens is located on a plane on which the image sensor is located.

8. The imaging apparatus according to claim 1, wherein the first microlens and the second microlens are made of a same optical material.

9. The imaging apparatus according to claim 1, wherein the first microlens and the second microlens are made of different optical materials, and wherein a difference between refractive indexes of the optical materials used by the first microlens and the second microlens falls within a range of [−0.01, 0.01].

10. An imaging method, applied to an imaging apparatus comprising a main lens, an image sensor, a first microlens array, a second microlens array and a driving apparatus, comprising:

adjusting a distance between the first microlens array and the second microlens array to a first distance when the imaging apparatus provides a light field mode, wherein the first distance is greater than zero, and wherein in the light field mode, an incident ray is first refracted from the main lens, second refracted from the first microlens array and the second microlens array, and then projected onto the image sensor; and adjusting the first microlens array and the second microlens array to attach M*N first microlenses comprised in the first microlens array to M*N second microlenses comprised in the second microlens array when the imaging apparatus provides a non-light-field mode, wherein in the non-light-field mode, the incident ray is refracted from the main lens and directly projected onto the image sensor through the first microlens array and the second microlens array, wherein the first microlens array and the second microlens array are arranged between the main lens and the image sensor, wherein the first microlens array is disposed between the second microlens array and the main lens, wherein the first microlens array is arranged in parallel with the second microlens array, wherein a second microlens comprises a planoconvex lens when a first microlens comprises a planoconcave lens, wherein the second microlens comprises the planoconcave lens when the first microlens comprises the planoconvex lens, wherein the M*N first microlenses are in a one-to-one correspondence to the M*N second microlenses in a concave-convex manner, wherein M and N are positive integers, wherein at least one of M or N is greater than one, and wherein the driving apparatus is coupled to the main lens, the image sensor, the first microlens array and the second microlens array, and is configured to adjust the distance between the first microlens array and the second microlens array.

11. The imaging method according to claim 10, wherein a combination of the first microlens array and the second microlens array is equivalent to a third microlens array, wherein the method further comprises adjusting a relative location among the main lens, the image sensor, the first microlens array and the second microlens array to a first relative location in the light field mode, and wherein after adjusting, an imaging plane of the third microlens array is located on a plane on which the image sensor is located, and a main plane of the third microlens array is located on an imaging plane of the main lens.

12. The imaging method according to claim 10, wherein a combination of the first microlens array and the second microlens array is equivalent to a third microlens array, wherein the method further comprises adjusting a relative location among the main lens, the image sensor, the first microlens array and the second microlens array to a second relative location in the light field mode, and wherein after adjusting, an imaging plane of the third microlens array is located on a plane on which the image sensor is located, and an imaging plane of the main lens is located between the main lens and a main plane of the third microlens array.

13. The imaging method according to claim 10, wherein a combination of the first microlens array and the second microlens array is equivalent to a third microlens array, wherein the method further comprises adjusting a relative location among the main lens, the image sensor, the first microlens array and the second microlens array to a third relative location in the light field mode, and wherein after adjusting, an imaging plane of the third microlens array is located on a plane on which the image sensor is located, and the image sensor is located between a main plane of the third microlens array and an imaging plane of the main lens.

14. The imaging method according to claim 10, further comprising adjusting a relative location among the main lens, the image sensor, the first microlens array and the second microlens array to a fourth relative location in the non-light-field mode, and wherein after adjusting, an imaging plane of the main lens is located on a plane on which the image sensor is located.

15. The imaging method according to claim 10, wherein the first microlens and the second microlens are made of a same optical material.

16. The imaging method according to claim 10, wherein the first microlens and the second microlens are made of different optical materials, and wherein a difference between refractive indexes of the optical materials used by the first microlens and the second microlens falls within a range of [−0.01, 0.01].

* * * * *